United States Patent
Garrett

[19]

[11] Patent Number: 6,113,671
[45] Date of Patent: Sep. 5, 2000

[54] CONTROLLING ATMOSPHERES IN CONTAINERS

[76] Inventor: Michael E. Garrett, 92 York Road, Woking, Surrey, United Kingdom

[21] Appl. No.: 08/857,671

[22] Filed: May 19, 1997

Related U.S. Application Data

[63] Continuation of application No. 08/597,375, Feb. 8, 1996, abandoned, which is a continuation of application No. 08/371,244, Jan. 11, 1995, abandoned, which is a continuation-in-part of application No. 08/042,973, Apr. 5, 1993, abandoned.

[30] Foreign Application Priority Data

Apr. 6, 1992 [GB] United Kingdom .................. 92 07495

[51] Int. Cl.$^7$ ................................................. B01D 53/047
[52] U.S. Cl. .................................. 95/98; 95/105; 95/119; 95/122; 95/130; 95/139; 95/143; 95/144; 426/419
[58] Field of Search .............................. 95/119, 121, 130, 95/139, 144, 96–105, 122, 143; 96/130–133, 143; 426/312, 319, 418, 419

[56] References Cited

U.S. PATENT DOCUMENTS

| | | | |
|---|---|---|---|
| 3,981,698 | 9/1976 | Leppard ..................................... | 95/119 |
| 4,228,197 | 10/1980 | Means ....................................... | 426/419 |
| 4,337,276 | 6/1982 | Nakamura et al. .................. | 426/419 X |
| 4,477,269 | 10/1984 | Kratz et al. ........................... | 95/121 X |
| 4,710,206 | 12/1987 | Allen et al. .......................... | 426/419 X |
| 4,845,958 | 7/1989 | Senda et al. ......................... | 426/419 X |
| 5,152,966 | 10/1992 | Roe et al. ............................. | 426/418 X |

FOREIGN PATENT DOCUMENTS

| | | | |
|---|---|---|---|
| 0315309 | 5/1989 | European Pat. Off. . | |
| 0467668 | 1/1992 | European Pat. Off. ............... | 426/418 |
| 0219377 | 3/1985 | United Kingdom ................... | 426/418 |

Primary Examiner—Robert H. Spitzer

[57] ABSTRACT

A process for controlling the atmosphere in a container including the steps of passing a pressurized portion of the atmosphere serially through a plurality of separate but inter-communicating adsorbent beds which selectively adsorb water vapor, ethylene, carbon dioxide and nitrogen from the compressed atmosphere, then isolating the ethylene-selective adsorbent and desorbing ethylene therefrom, then desorbing nitrogen from the nitrogen-selective adsorbent and purging the carbon dioxide-selective bed, the ethylene-selective bed and the water vapor-selective bed with the desorbed nitrogen, and returning the purge and purged gas mixture to the container.

6 Claims, 1 Drawing Sheet

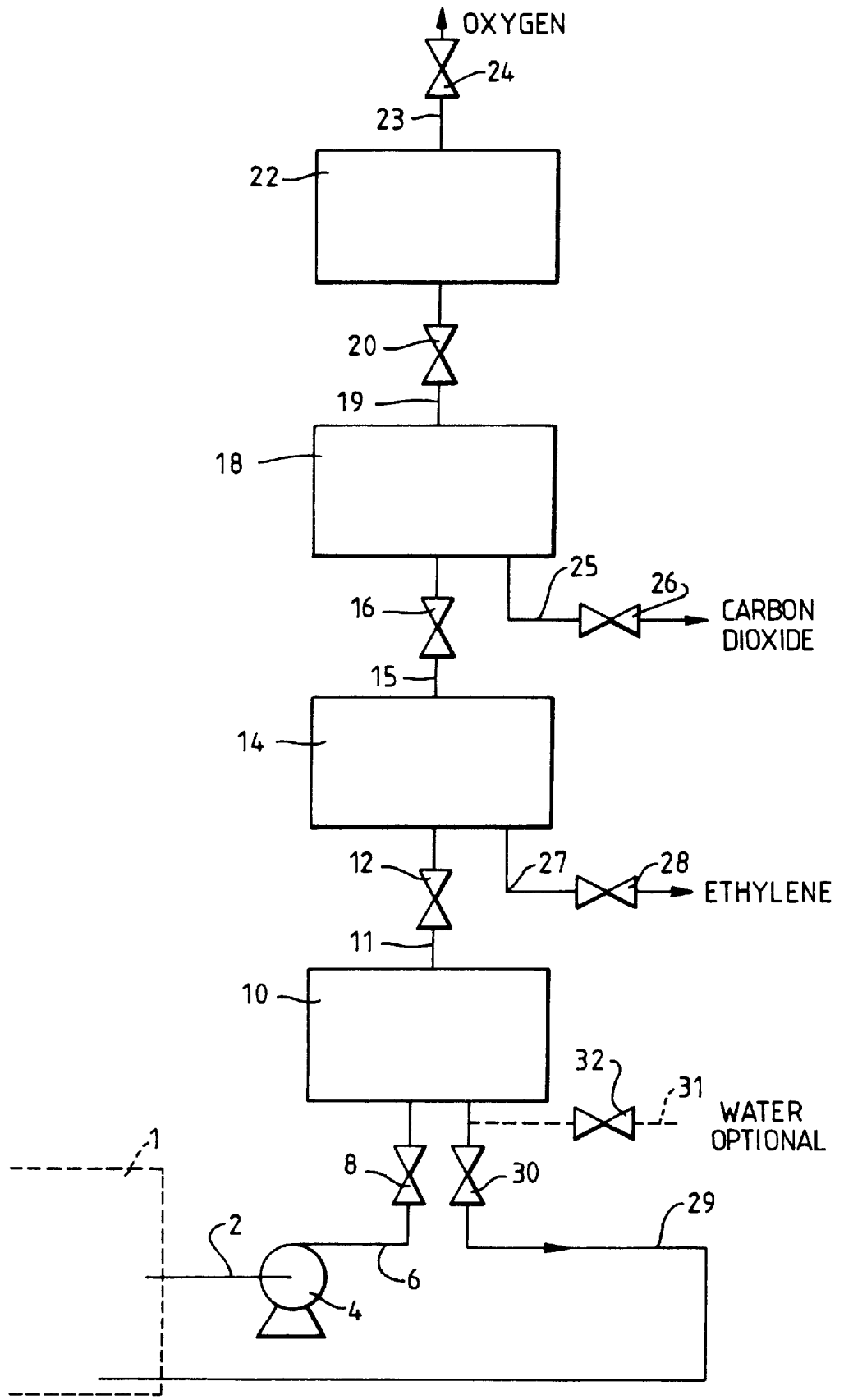

CONTROLLING ATMOSPHERES IN CONTAINERS

RELATED CASE

This is a continuation of application Ser. No. 08/597,375, filed Feb. 8, 1996, which is a continuation of application Ser. No. 08/371,244, filed Jan. 11, 1995, which is a continuation-in-part of application Ser. No. 08/042,973, filed Apr. 5, 1993, all abandoned, claiming priority of Application No. GB 92 07495.4, filed Apr. 6, 1992, now pending.

FIELD OF THE INVENTION

The present invention relates to systems for controlling the atmosphere within containers and more particularly to systems for controlling the atmosphere in containers used for the storage and transportation of perishable produce such as fruit, vegetables and flowers.

BACKGROUND OF THE INVENTION

It is known that during the storage and/or transportation of perishable produce its preservation can be enhanced by controlling the atmosphere surrounding the produce. For example, it has been found that an atmosphere in which nitrogen predominates is particularly useful for controlling the preservation of perishable products. Furthermore, in addition to controlling the amount of oxygen present in the atmosphere there has also been found a need to control the amount of other substances which may be present, for example, carbon dioxide and ethylene which might be formed by the produce whilst contained within the container.

In our co-pending European Patent Application No. 91306504.1 (Publication No. 0 467 668 A1) there is described a system for controlling the atmosphere of a container for use in the storage and/or transportation of perishable goods. The system includes adsorption means in the form of a plurality of pairs of beds, each pair of beds being designed preferentially to adsorb from the atmosphere one or more of water vapor, ethylene, carbon dioxide, and nitrogen. Some of the beds are designed to work on a temperature swing adsorption cycle and at least one bed is designed to operate on a pressure swing adsorption/desorption cycle.

Although the system described in our co-pending application achieves all of the requirements in terms of atmosphere control it remains complicated and somewhat bulky and in particular heat is required to assist in the regeneration of the adsorbent beds which are designed to operate on the temperature swing adsorption cycle.

It is an aim of the present invention to provide a simplified system which will achieve the same effect, that is, independent control of the gases likely to be found in the atmosphere of a container for perishable goods.

SUMMARY OF THE INVENTION

One embodiment of the present invention provides a system for controlling the atmosphere within a container comprising a plurality of separate but inter-communicating adsorbent beds arranged in a single series for the selective adsorption at least in part and in a predetermined order of any water vapor, ethylene, carbon dioxide and nitrogen present in the atmosphere, means for controlling the flow of atmosphere between successive adsorbent beds, means for isolating and venting at least some of the adsorbent beds to ambient atmosphere, means for urging the atmosphere under pressure towards the adsorbent beds, means for purging the carbon dioxide-selective bed, the ethylene-selective bed and the water vapor-selective bed with nitrogen desorbed from the nitrogen-selective adsorbent bed, and means for returning the controlled atmosphere to the container.

Another embodiment of the invention provides a process for controlling the atmosphere within a container comprising pressuring a portion of the atmosphere; passing the pressurized atmosphere cocurrently through a plurality of separate but inter-communicating adsorbent beds arranged in a single series for the selective adsorption at least in part of first water vapor, then one of ethylene or carbon dioxide, then the other of ethylene or carbon dioxide, and lastly nitrogen; then isolating the ethylene-selective bed and desorbing ethylene therefrom to the environment, then re-establishing fluid communication between the beds and depressurizing the system of adsorption beds by permitting the compressed atmosphere to return to the container, thereby desorbing nitrogen from the nitrogen-selective bed and causing the desorbed nitrogen to pass countercurrently through each of the other beds and return to the container, thereby purging and regenerating each of the other beds, including the ethylene-selective adsorbent bed and returning the nitrogen purge gas to the container, together with carbon dioxide, ethylene and water vapor purged from the respective beds by the nitrogen purge gas.

According to a preferred embodiment of the invention, the ethylene-selective adsorbent bed precedes the carbon dioxide-selective adsorbent bed in the series, and according to an alternative embodiment the carbon dioxide-selective adsorbent bed precedes the ethylene-selective adsorbent bed in the series.

According to a variation of the above-described embodiment, the ethylene-selective bed and the carbon dioxide-selective bed are each isolated from the other beds and the ethylene and all or a portion of the carbon dioxide are desorbed from the isolated beds and vented to the environment.

According to another variation of the above-described embodiment, the ethylene-selective bed and the water vapor-selective bed are each isolated from the other beds and the ethylene and all or a portion of the water vapor are desorbed from the isolated beds and vented to the environment.

According to a third variation of the above-described embodiment, the ethylene-selective bed, the carbon dioxide-selective bed and the water vapor-selective bed are each isolated and the ethylene and all or a portion of the carbon dioxide and all or a portion of the water vapor are desorbed from the isolated beds and vented to the environment.

BRIEF DESCRIPTION OF THE DRAWINGS

An embodiment of the invention will now be described, by way of example, reference being made to the FIGURE of the accompanying diagrammatic drawing which is a schematic flow diagram of a system for controlling the atmosphere within a container.

DETAILED DESCRIPTION OF THE INVENTION

For the avoidance of doubt, the word "container" used throughout this specification is intended to embrace not only individual containers but also enclosed parts of warehouses, ship's holds and the like.

As shown in the FIGURE, a system for controlling the atmosphere in a container 1 for perishable goods such as fruit, vegetables and flowers comprises a line 2 communicating at one end with the interior of the container 1 and at its opposite end with the suction side of a compressor 4. A line 6 controlled by a valve 8 extends from the outlet of compressor 4 to the inlet of a first adsorbent bed 10 which forms part of a plurality of adsorbent beds 10, 14, 18, 22 arranged in series.

As shown, the adsorbent bed 10 is connected by line 11 controlled by valve 12 to the adsorbent bed 14. Adsorbent bed 14 is connected by line 15 controlled by valve 16 to the adsorbent bed 18. The adsorbent bed 18 is connected by line 19 controlled by valve 20 to the adsorbent bed 22. A line 23 controlled by valve 24 extends from the adsorbent bed 22 for use in venting the adsorbent bed 22 to ambient atmosphere as will be explained.

The adsorbent bed 10 contains a material, for example, alumina, adapted to remove water vapor from the container atmosphere feed gas stream. The adsorbent bed 14 contains a selective zeolitic ethylene adsorber, preferably a metal substituted NaY type zeolite. The ethylene adsorber adsorbs ethylene preferentially over nitrogen in particular. The adsorbent bed 18 contains a material effective for removing carbon dioxide and examples of such materials are zeolites such as zeolite 13X and mordenites, alumina carbon molecular sieve and activated carbon. The adsorbent bed 22 contains a zeolite material which preferentially adsorbs nitrogen.

Extending from the adsorbent bed 18 is a line 25 controlled by a valve 26. Similarly, a line 27 controlled by a valve 28 extends from the adsorbent bed 14. A line 29 controlled by valve 30 extends from the first adsorbent bed 10 back to the interior of container 1. Finally, a line 31 may be included which communicates with the interior of the adsorbent bed 10 and is controlled by a valve 32.

The perishable foodstuffs such as fruits and vegetables contained within container 1 tend to consume oxygen and emit carbon dioxide and ethylene during storage in amounts which if left uncontrolled would hasten spoilage. In accordance with the present invention the container 1 is provided with a gaseous atmosphere having a predominant amount of relatively inert gas such as nitrogen and to this effect a portion of the atmosphere within the container 1 is removed by the action of the compressor 4 via line 2. The compressed atmosphere then passes through line 6 and open valve 8 into adsorbent bed 10 and subsequently through line 11 and valve 12 to adsorbent bed 14; line 15 open valve 16 to adsorbent bed 18; and through line 19 open valve 20 to adsorbent bed 22. At this time the valves 24, 26, 28 and 32 are closed such that all the adsorbent beds will be pressurized to such an effect that the water vapor in the compressed atmosphere is adsorbed in the adsorbent bed 10, the ethylene is entrapped on the sieve in the adsorbent bed 14, carbon dioxide is adsorbed in the adsorbent bed 18, and nitrogen is adsorbed in the adsorbent bed 22.

When the beds have reached a predetermined pressure the valve 24 is opened so that the interstitial oxygen gas in bed 22 can be discharged to ambient atmosphere. Alternatively, the opening and closing of valve 24 can be regulated such that oxygen can be continuously or intermittently discharged from bed 22 both during and after the pressurization step. The communicating valves 12, 16, 20 are then closed and the adsorbent bed 14 is vented to ambient atmosphere by opening valve 28 such that ethylene passes from the adsorbent bed 14 through line 27 and valve 28 to ambient atmosphere. At the same time the adsorbent bed 18 can be vented by opening the valve 26 such that carbon dioxide passes from the bed 18 through line 25 and valve 26 to ambient atmosphere.

The valves 26, 28 are then closed and the communicating valves 12, 16, 20 are reopened together with the valve 30 such that pressurized controlled atmosphere gas then passes back to the container via the line 29.

It will be evident, that the system can be readily controlled to provide a desired atmosphere within the container 1. By selecting the amount of oxygen leaving the bed 22 via line 23 and valve 24 the oxygen concentration in the container 1 can be allowed to increase because of air ingress or decreased by venting the gas to ambient atmosphere.

Similarly, the carbon dioxide can be rejected in whole or in part according to the amount vented from the adsorbent bed 18 via line 25 and valve 26. The same is true of the adsorbent bed 14. However, in practice it is normal to vent fully the ethylene to keep the concentration of ethylene in the container 1 to an absolute minimum.

The adsorbent bed 10 need not have a vent to ambient atmosphere because in most situations it is important to maintain a high humidity. However, in some situations that may not be desirable and line 31 controlled by valve 32 can be provided to allow venting to ambient atmosphere.

The embodiment described above refers to a single series of adsorbent beds and this would lead to an intermittent use of the compressor 4.

One advantage of the above described embodiment is that the adsorbent beds are based on the pressure swing adsorption/desorption cycle which operates at a faster rate than the equivalent temperature swing adsorption cycle. This means that the quantity of adsorbent material required is very much reduced and consequently the system becomes very much smaller than heretofore.

A principal advantage of the invention is that the system employed is very compact and is free of the additional conduits and valves associated with dual parallel bed systems. Furthermore, since the carbon dioxide-selective bed, the ethylene-selective bed and the water vapor-selective bed are all purged by nitrogen-enriched gas that is desorbed from the fourth bed, the process of the invention enjoys the advantage of not requiring external purge sources and their associated conduits and valves, as is required in prior art systems.

From the forgoing, it will be appreciated that, although specific embodiment of the invention have been described herein for purposes of illustration, various modifications may be made without deviating from the spirit and scope of the invention. Accordingly, the invention is not to be limited except as by the appended claims.

I claim:

1. A process for modifying the composition of a gaseous atmosphere comprising nitrogen, oxygen, carbon dioxide, water vapor and ethylene contained in a chamber, using a series of four single adsorption vessels, adjacent vessels of the series being connected by a single process flow conduit, by a pressure swing adsorption method comprising the successive steps:

(a) pressurizing a portion of said atmosphere to form a pressurized atmosphere;

(b) adsorbing water vapor from said pressurized atmosphere by passing it cocurrently through the first adsorption vessel in said series, which contains an adsorbent which preferentially adsorbs water vapor, thereby adsorbing water vapor from said pressurized atmosphere and producing a pressurized water vapor-depleted atmosphere;

(c) passing said pressurized water vapor-depleted atmosphere cocurrently through the single process flow conduit between the first and second adsorption vessels and then cocurrently through said second adsorption vessel, which contains an adsorbent which preferentially adsorbs ethylene, thereby adsorbing ethylene from said pressurized said water vapor-depleted atmosphere and producing a pressurized water vapor- and ethylene-depleted atmosphere;

(d) passing said pressurized water vapor- and ethylene-depleted atmosphere cocurrently through the single process flow conduit between the second and third adsorption vessels and then cocurrently through said third adsorption vessel, which contains an adsorbent which preferentially adsorbs carbon dioxide, thereby adsorbing carbon dioxide from said pressurized water vapor- and ethylene-depleted atmosphere and producing a pressurized water vapor-, ethylene- and carbon dioxide-depleted atmosphere;

(e) passing said pressurized water vapor-, ethylene- and carbon dioxide-depleted atmosphere cocurrently through the single process flow conduit between the third and fourth adsorption vessels and then cocurrently through said fourth adsorption vessel, which contains an adsorbent which preferentially adsorbs nitrogen, thereby adsorbing nitrogen from said pressurized water vapor-, ethylene- and carbon dioxide-depleted atmosphere;

(f) isolating and depressurizing said second adsorption vessel, thereby desorbing ethylene from the adsorbent therein, and venting desorbed ethylene to the environment;

(g) countercurrently depressurizing said fourth adsorption vessel, thereby desorbing nitrogen-rich gas from the adsorbent therein;

(h) purging said third adsorption vessel by passing said nitrogen-rich gas countercurrently through the single process flow conduit between the third and fourth adsorption vessels and then countercurrently through said third adsorption vessel;

(i) passing nitrogen-rich gas from said third adsorption vessel countercurrently through the single process flow conduit between the second and third adsorption vessels and then countercurrently through said second adsorption vessel;

(j) purging said first bed by passing nitrogen-rich gas from said second adsorption vessel countercurrently through the single process flow conduit between the first and second adsorption vessels and then countercurrently through said first adsorption vessel, thereby producing a moistened nitrogen-rich gas; and (k) returning said moistened nitrogen-rich gas to said chamber.

2. The process of claim 1, further comprising isolating and desorbing carbon dioxide from the adsorbent in said third vessel and venting desorbed carbon dioxide to the environment prior to step (g).

3. The process of claim 1, or claim 2, further comprising isolating and desorbing water vapor from the adsorbent in said first bed and venting desorbed water vapor to the environment prior to step (j).

4. A process for modifying the composition of a gaseous atmosphere comprising nitrogen, oxygen, carbon dioxide, water vapor and ethylene contained in a chamber, using a series of four single adsorption vessels, adjacent vessels of the series being connected by a single process flow conduit, by a pressure swing adsorption method comprising the successive steps:

(a) pressurizing a portion of said atmosphere to form a pressurized atmosphere;

(b) adsorbing water vapor from said pressurized atmosphere by passing it cocurrently through the first adsorption vessel in said series, which contains an adsorbent which preferentially adsorbs water vapor, thereby adsorbing water vapor from said pressurized atmosphere and producing a pressurized water vapor-depleted atmosphere;

(c) passing said pressurized water vapor-depleted atmosphere cocurrently through the single process flow conduit between the first and second adsorption vessels and then cocurrently through said second adsorption vessel, which contains an adsorbent which preferentially adsorbs carbon dioxide, thereby adsorbing carbon dioxide from said pressurized said water vapor-depleted atmosphere and producing a pressurized water vapor- and carbon dioxide-depleted atmosphere;

(d) passing said pressurized water vapor- and carbon dioxide-depleted atmosphere cocurrently through the single process flow conduit between the second and third adsorption vessels and then cocurrently through said third adsorption vessel, which contains an adsorbent which preferentially adsorbs ethylene, thereby adsorbing ethylene from said pressurized water vapor- and carbon dioxide-depleted atmosphere and producing a pressurized water vapor-, ethylene- and carbon dioxide-depleted atmosphere;

(e) passing said pressurized water vapor-, ethylene- and carbon dioxide-depleted atmosphere cocurrently through the single process flow conduit between the third and fourth adsorption vessels and then cocurrently through said fourth adsorption vessel, which contains an adsorbent which preferentially adsorbs nitrogen, thereby adsorbing nitrogen from said pressurized water vapor-, ethylene- and carbon dioxide-depleted atmosphere;

(f) isolating and depressurizing said third adsorption vessel, thereby desorbing ethylene from the adsorbent therein, and venting desorbed ethylene to the environment;

(g) countercurrently depressurizing said fourth adsorption vessel, thereby desorbing nitrogen-rich gas from the adsorbent therein;

(h) passing nitrogen-rich gas from said fourth adsorption vessel countercurrently through the single process flow conduit between the third and fourth adsorption vessels and then countercurrently through said third adsorption vessel;

(i) purging said second adsorption vessel by passing said nitrogen-rich gas countercurrently through the single process flow conduit between the second and third adsorption vessels and then countercurrently through said second adsorption vessel;

(j) purging said first bed by passing nitrogen-rich gas from said second adsorption vessel countercurrently through the single process flow conduit between the first and second adsorption vessels and then countercurrently through said first adsorption vessel, thereby producing a moistened nitrogen-rich gas; and (k) returning said moistened nitrogen-rich gas to said chamber.

5. The process of claim 4, further comprising isolating and desorbing carbon dioxide from the adsorbent in said second vessel and venting desorbed carbon dioxide to the environment prior to step (i).

6. The process of claim 4, or claim 5, further comprising isolating and desorbing water vapor from the adsorbent in said first vessel and venting desorbed water vapor to the environment prior to step (j).

* * * * *